United States Patent
Saffre et al.

(10) Patent No.: US 7,565,149 B2
(45) Date of Patent: Jul. 21, 2009

(54) CHANNEL SELECTION

(75) Inventors: Fabrice T P Saffre, Kesgrave (GB); Richard E Tateson, Wickham Market (GB)

(73) Assignee: British Telecommunications public limited company, London (GB)

( * ) Notice: Subject to any disclaimer, the term of this patent is extended or adjusted under 35 U.S.C. 154(b) by 129 days.

(21) Appl. No.: 10/571,482

(22) PCT Filed: Sep. 8, 2004

(86) PCT No.: PCT/GB2004/003836

§ 371 (c)(1), (2), (4) Date: Mar. 14, 2006

(87) PCT Pub. No.: WO2005/029788

PCT Pub. Date: Mar. 31, 2005

(65) Prior Publication Data

US 2006/0217062 A1  Sep. 28, 2006

(30) Foreign Application Priority Data

Sep. 23, 2003 (GB) .............................. 0322270.0
Oct. 20, 2003 (GB) .............................. 0324455.5

(51) Int. Cl.
H04W 72/00 (2009.01)
H04B 7/00 (2006.01)

(52) U.S. Cl. ................ 455/450; 455/63.1; 455/69; 455/522; 370/329

(58) Field of Classification Search ........... 455/11.1, 455/13.1, 522, 63.1, 67.13, 69, 446, 450, 455/452.1, 455; 370/328, 329

See application file for complete search history.

(56) References Cited

U.S. PATENT DOCUMENTS 5,732,077 A * 3/1998 Whitehead ............... 370/349

(Continued)

FOREIGN PATENT DOCUMENTS

EP 1 074 161 B1 7/2002

(Continued)

OTHER PUBLICATIONS

International Search Report dated Dec. 3, 2004.

(Continued)

*Primary Examiner*—Quochien B Vuong
(74) *Attorney, Agent, or Firm*—Nixon & Vanderhye P.C.

(57) ABSTRACT

Wireless devices in (10, 20, 30 etc) in an ad hoc network each select a channel on which to operate such that conflicts with neighbouring devices are avoided. Each device (20) has a normal power output, giving it a normal range (31) and an enhanced power output, giving it an extended "inhibition" range (33). Initially each device (20) transmits at the enhanced power level, such that it can be detected by devices (40, 50) within the extended range (33). If it detects other devices transmitting on the same channel, it may change to another channel. Once a channel has been identified on which no conflict is detected, the device (20) switches to the normal power level. By initiating the channel selection process at the enhanced level, conflicts between the transmissions of devices (20, 40), which would be detectable at a device (30) within the normal range of both, can be avoided despite the two devices (20, 40) not being able to detect each other directly at the normal power level. To conserve battery power, the process is arranged to have the devices operate at the enhanced power for the minimum time necessary, by dropping to the normal level when a suitable channel has been identified with a reasonable degree of certainty.

18 Claims, 6 Drawing Sheets

U.S. PATENT DOCUMENTS

| | | | | |
|---|---|---|---|---|
| 5,850,592 | A | * | 12/1998 | Ramanathan ................... 455/7 |
| 6,473,617 | B1 | * | 10/2002 | Larsen et al. ............... 455/446 |
| 6,539,228 | B1 | | 3/2003 | Tateson |
| 6,594,468 | B1 | * | 7/2003 | Ramanathan ................... 455/7 |
| 6,650,905 | B1 | * | 11/2003 | Toskala et al. .............. 455/522 |
| 7,012,904 | B2 | * | 3/2006 | Taketsugu ................... 370/329 |
| 2001/0036810 | A1 | * | 11/2001 | Larsen ...................... 455/11.1 |
| 2001/0050909 | A1 | * | 12/2001 | Taketsugu ................... 370/329 |
| 2002/0102968 | A1 | * | 8/2002 | Arend et al. ................ 455/414 |
| 2002/0136233 | A1 | * | 9/2002 | Chen et al. .................. 370/445 |
| 2002/0173323 | A1 | * | 11/2002 | Tateson ...................... 455/509 |
| 2003/0013474 | A1 | * | 1/2003 | Pham et al. ................. 455/522 |
| 2003/0068975 | A1 | * | 4/2003 | Qiao et al. ................ 455/11.1 |
| 2004/0259522 | A1 | * | 12/2004 | Alicherry et al. ......... 455/404.2 |
| 2005/0190821 | A1 | * | 9/2005 | Fujii et al. ................... 375/211 |

FOREIGN PATENT DOCUMENTS

| | | | | |
|---|---|---|---|---|
| GB | | 2379358 A | * | 3/2003 |
| JP | | 10-107726 | | 4/1998 |
| NZ | | 509242 A | | 1/2001 |
| WO | WO 01/65784 | A2 | | 9/2001 |
| WO | WO 02/41521 | A2 | | 5/2002 |
| WO | WO 02/082751 | A2 | | 10/2002 |

OTHER PUBLICATIONS

GB Search Report dated Feb. 17, 2004.

Tateson: "Self-Organising Pattern Formation: Fruit Flies and Cell Phones", Lecture Notes in Computer Science, 'Online! 1998, pp. 1-10, XP002307539.

Saffre et al., "Reliable Sensor Networks Using Decentralised Channel Selection", Computer Networks, Elsevier Science Publishers B.V., Amsterdam, NL, vol. 46, No. 5, Dec. 5, 2004, pp. 651-663, XP004610795.

* cited by examiner

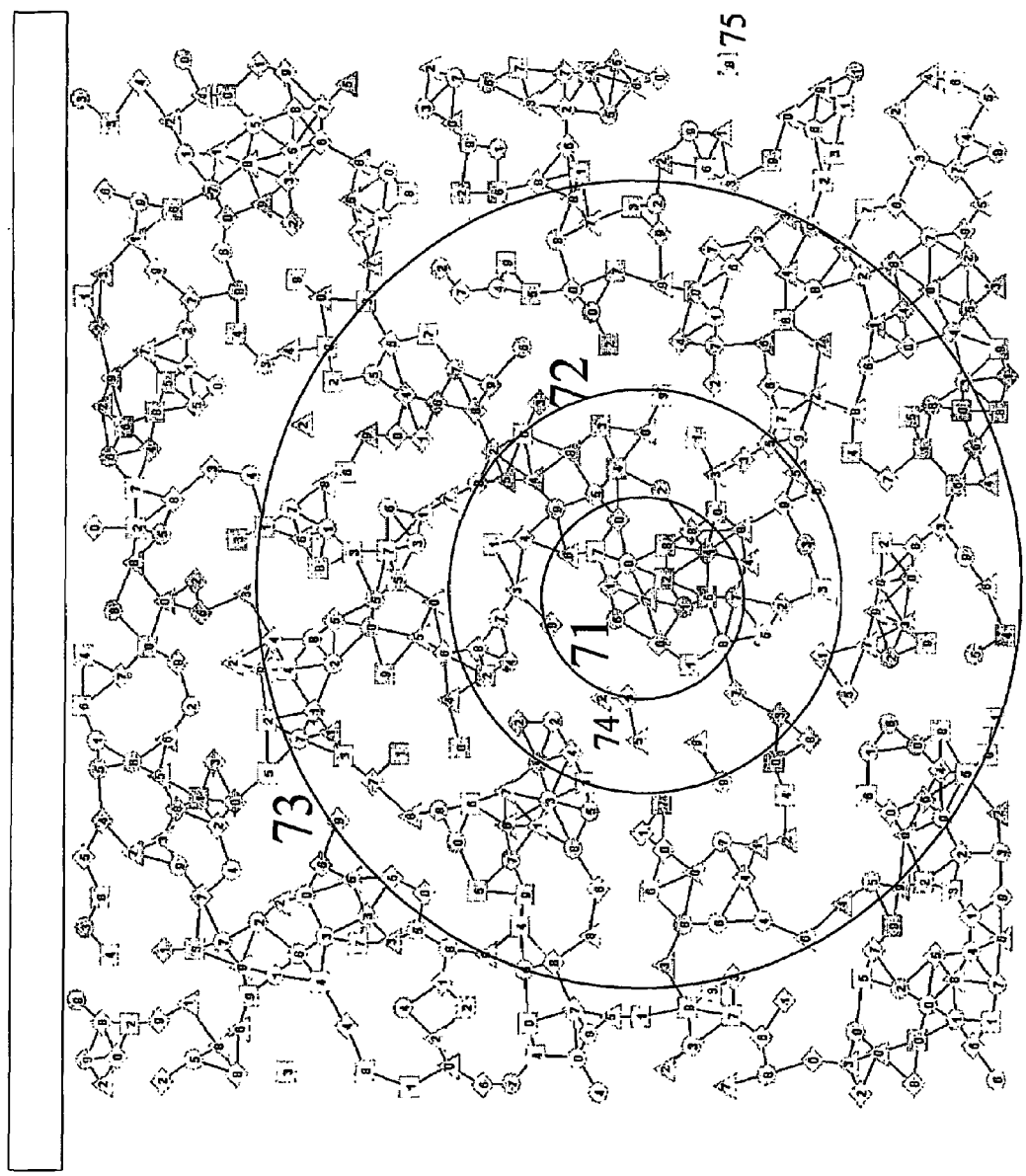

CHANNEL SELECTION

This application is the US national phase of international application PCT/GB2004/003836 filed 8 Sep. 2004 which designated the U.S. and claims benefit of GB 0322270.0 and GB 0324455.5, dated 23 Sep. 2003 and 20 Oct. 2003, respectively the entire content of which is hereby incorporated by reference.

BACKGROUND AND SUMMARY

This invention relates to the selection of channels in wireless communications networks, and in particular for ad hoc communications networks. An important factor in deploying any radio network as the avoidance of co-channel interference between transmitters operating at the same frequency. Conventionally, network architectures are planned in advance, and the necessary infrastructure is then deployed according to that plan. However, this approach may be impractical where a network needs to be deployed rapidly, or where there are too many unknown factors such as difficult environmental conditions or unpredictable spatial distribution of the network elements. Such factors are of particular relevance in situations such as disaster relief or battlefield situations, where there is insufficient time or information to plan the deployment of the resources. Advance planning is also impractical in circumstances where the devices themselves may move in unpredictable ways. For example, sensors may be distributed in an environment such that they are carried along with the movement of phenomena such as glaciers, ocean or atmospheric currents, lava flows, or wildlife, so that the behaviour of these phenomena can be monitored. Such sensors need to return the data they collect to a user.

In such circumstances, the network architecture cannot be planned in advance, but needs to be established in real time or close to it. In particular, the architecture has to be planned after the deployment of the hardware. In such circumstances, an "ad hoc" network architecture has to be developed. This can be achieved by having the individual devices negotiate amongst themselves so as to evolve a set of interconnections that can subsequently be used to pass information across the entire population of devices. Since the individual devices cannot have an overview of the whole network, (at least until the network is operational) each device can only use information that it can obtain for itself.

Many such ad-hoc networks involve mobile devices, which require constant updates to the web of interactions. However, this approach can also be used for the deployment of static devices, in circumstances in which there is no pre-existing network infrastructure, such as in disaster-relief operations or the deployment of sensors in order to survey large, potentially hostile environments such as volcanoes or enemy territory.

For many applications in which ad hoc networks are useful there is no pre-existing cabled medium, either for communications or power supply purposes. Most ad hoc networks therefore have to operate more or less exclusively through wireless communication, (usually radio), and the individual devices have to have their own power sources. Wireless connection offers many opportunities of fine-tuning through the use of multiple frequencies, time slicing and/or variable transmission power. However, it also adds complexity to the problem of achieving successful, robust and durable network integration, due to interference and limited battery lifetime. An important objective is to arrange that all nodes of the emerging network are mutually reachable over a long enough period to justify their deployment. As a result, identifying ways of preventing the formation of "islands" that cannot communicate with each other, due either to poor (indirect) long-range synchronisation or to the disappearance of key relays after they have exhausted their power supply, has become a high priority target in ad-hoc communication research.

There is therefore a need to configure the operation of the devices to mitigate the interference problem, while simultaneously managing battery power so as to ensure that the system as a whole can function for a sufficient time to be of any use. A difficulty resides in the fact that topological unpredictability dictates that nodes have to select their preferred frequency on the basis of local interactions only. This can be achieved through inhibitory signalling, as described in the applicant company's U.S. Pat. No. 6,539,228 and European patent 1074161. In this reference the devices exchange information with their neighbours or influence each other's preference. Alternatively, the devices may disregard frequencies that are already in use in their immediate vicinity. This process addresses interference in a single hop situation, such as between neighbouring base stations of a cellular radio network. In this situation the objective is to maintain stable connection between a first type of device (the fixed base stations) and a second type of device (the mobile phone units) at the interface between adjacent cells. This process ensures that immediate neighbours do not share the same frequency. In other words, it prevents overlap between adjacent regions, which is enough to organise frequency allocation between base stations that are meant to exchange information with a second type of device, such as fixed cellular base stations co-operating with mobile phones.

However, such a process does not deal adequately with networks in which any two nodes can exchange information via a sequence of hops along stable radio connections. To ensure stable connections exist throughout the network, it is necessary that each node is capable of sending data to its immediate neighbours without the risk that the signal is corrupted on the receiver's end by collision with other incoming packets. Such networks require that any two devices operating on the same channel (frequency, timeslot etc) must not both be within range of a third device. A conflict can occur in this situation, even though the two devices are not within range of each other, since the third device will nevertheless experience co-channel interference. In other words, "second" neighbours should also not be allowed to use the same frequency. This requirement requires the ability to identify conflicts between transmitters that cannot detect each other directly in normal operation. This is difficult to achieve using local inhibitory signalling only.

One way around this synchronisation problem is through acknowledgement messages ("ACK"s). However, this introduces its own difficulties. One is that emitting ACKs consumes battery power, which can be a serious limitation in an ad-hoc environment where the devices are operating on battery power and are difficult to access. The second, more subtle but also more complex to deal with, is that ACKs themselves can collide or be lost, with permanent instability as a possible result. For example, an ACK message can be lost, causing the emitter to mistakenly assume that the original packet has not been received properly. This can lead the node to attempt a frequency shift that could in fact result in a collision on the receiver's end, which would clearly initiate a pathological loop of successive adjustments.

This can in fact be represented as a "tiling" problem, with the extra constraint that not only should adjacent regions never share the same channel, but neither should two regions which are both adjacent to a third one. FIG. 1 illustrates a simple example, in which the nodes are conveniently disposed in a rectilinear formation. Each tile represents a communication node positioned at its centre. The maximum range of each node lies between 1 and 1.4 times the grid spacing. With these limits, each device can only communicate with its closest neighbours in the grid, and not with those further away. Each node is to be allocated one of the five channels a, b, c, d, or e. Two tiled lattices are depicted. The left hand diagram obeys the condition "no immediate neighbours share the same channel". (Two tiles are considered to be "immediate neighbours" if they share an edge, but not if they only share a corner). Thus two tiles may share the same channel, provided only that they are not immediate neighbours. This is relatively simple to arrange, as each device can communicate directly with its immediate neighbours and co-operate with them to avoid using the same channels. However, several examples may be seen of two tiles using the same channel and having a neighbour in common—a network node represented by that common neighbour would experience co-channel interference between transmissions from its two neighbours. Those two neighbours are not capable of communicating directly with each other to avoid this problem.

The right hand diagram of FIG. 1 satisfies the additional condition that "no second neighbours share the same channel", (where a "second neighbour" of a given device is a "immediate neighbour" of another device which is itself an immediate neighbour of the given device). In this case any two tiles having the same channel allocation are separated by at least two other tiles—either in a straight line or in a "two across and one up" or "chess knight's move" relationship. Therefore no tile is adjacent to any two other tiles both allocated to the same channel. Such an arrangement would ensure that, for any node in the system, no collisions are possible at the receiver's end between its immediate neighbours.

The difficulty resides in arranging for such an arrangement to happen when each device has to select its operational channels only on the basis of locally available information. If each device only has information available to it relating to its immediate neighbours, a stable periodic pattern such as the one shown on the right hand side of FIG. 1 is not possible to achieve except fortuitously. The problem, then, is how to get two devices to co-operate with each other to avoid interference, when such interference can occur in circumstances in which the devices cannot detect each other directly.

According to the invention, there is provided a wireless communications relay device, comprising a receiver for detecting transmissions from other such devices, and a transmitter for transmitting signals at a first power level for normal traffic, and a higher, inhibition level, in order that its transmissions may be detected by other such devices over a wider area than its normal operating range. Preferably the device also has control means for selecting a channel and a transmission power on which the transmitter should operate, the control means may be arranged to inhibit the transmitter from selecting channels detected by the receiver.

According to another aspect, there is provided a method of channel selection in a network of wireless communications relay devices, wherein each device is inhibited from operating on a channel detectable on transmissions received from another such device, when operating at an inhibition transmission power, in order to inhibit other such devices from selecting the same channel, wherein the inhibition transmission power is higher than the normal transmission power of the devices such that selection of the same channel is inhibited over a wider area than the normal operating range of the device.

The channel selection process may be operated on a computer, programmed with the relative separations and characteristics of the devices, and having means to control the operation of the relay devices in accordance with the results of the selection process. The relative separations may be determined from position information, and may take into account other properties such as path length or attenuation. However, in a preferred arrangement each device performs the channel selection process for itself, each device being operable on a selected channel at the inhibition transmission power and being capable of detecting transmissions from other such devices on the selected channel.

Preferably each device selects a channel on which to attempt to operate, and each such device transmits on that channel and also monitors the channel for conflicting transmissions from other devices, and determines, from the conflicts detected, whether to operate on the same or a different channel.

In a preferred arrangement, the control means selects a channel for operation by an iterative process, in which a plurality of attempts to transmit on a selected channel that are made, and the probability of the channel being selected increases according to the number of such attempts on which no conflicting transmissions are detected by the receiver.

In the preferred embodiment, the process is iterative, a property associated with each device being updated according to the number of attempts to transmit on a given channel have detected interference on that channel, and the said property is then used to control a probabilistic function which determines whether to switch to a different channel for subsequent attempts. If the said property also satisfies a threshold value the device may switch to normal operation.

It may be arranged that devices which are unable to identify a suitable channel on which to operate are not allocated a channel.

This invention therefore provides devices equipped to solve the problem of interference beyond their normal range. As a result, stable links can be established across the network, which provides the basis for successful message passing between distant regions.

The available bandwidth may be divided into channels in any known way, such as frequency division, time division, or code division. The embodiments to be described use frequency and time division, but this should not be taken as limitative of the scope of the invention.

Inhibition is preferably interpreted by the receiving node purely on the basis of received signal strength. It would be possible to base inhibition on information contained in a message, but this requires some degree of effective communication between the nodes in question to be in place already.

In the described embodiment the data relay devices are mobile devices communicating with each other using radio waves or other electromagnetic radiation, or by acoustic signals such as ultrasound. However, the invention may also be applied in a fixed-wire system.

The channel allocation process is thus carried out by the relay devices themselves, on the basis of information they can ascertain by interaction with a limited number of neighbours. The absence of an overall controlling function makes the invention equally suitable for networks with any number of elements since, at the level at which the computational process takes place, the scale of the problem is the same. To put it another way, the computational power required to process the allocation problem is in proportion to the number of elements in the network. Since the computation is in fact performed by those elements, the computational power available is also proportional to the number of elements in the network. Thus the computational overhead, as a proportion of the resources avaialable, is independent of the size of the network.

BRIEF DESCRIPTION OF THE DRAWINGS

An embodiment of the invention will now be described, by way of example, with reference to the Figures, in which

FIG. 6 is a diagram of an ad hoc network made up of devices of the kind shown in FIG. 2, illustrating a network configuration with an irregular node distribution.

DETAILED DESCRIPTION OF NON-LIMITING, EXEMPLARY EMBODIMENTS

Figure 2:
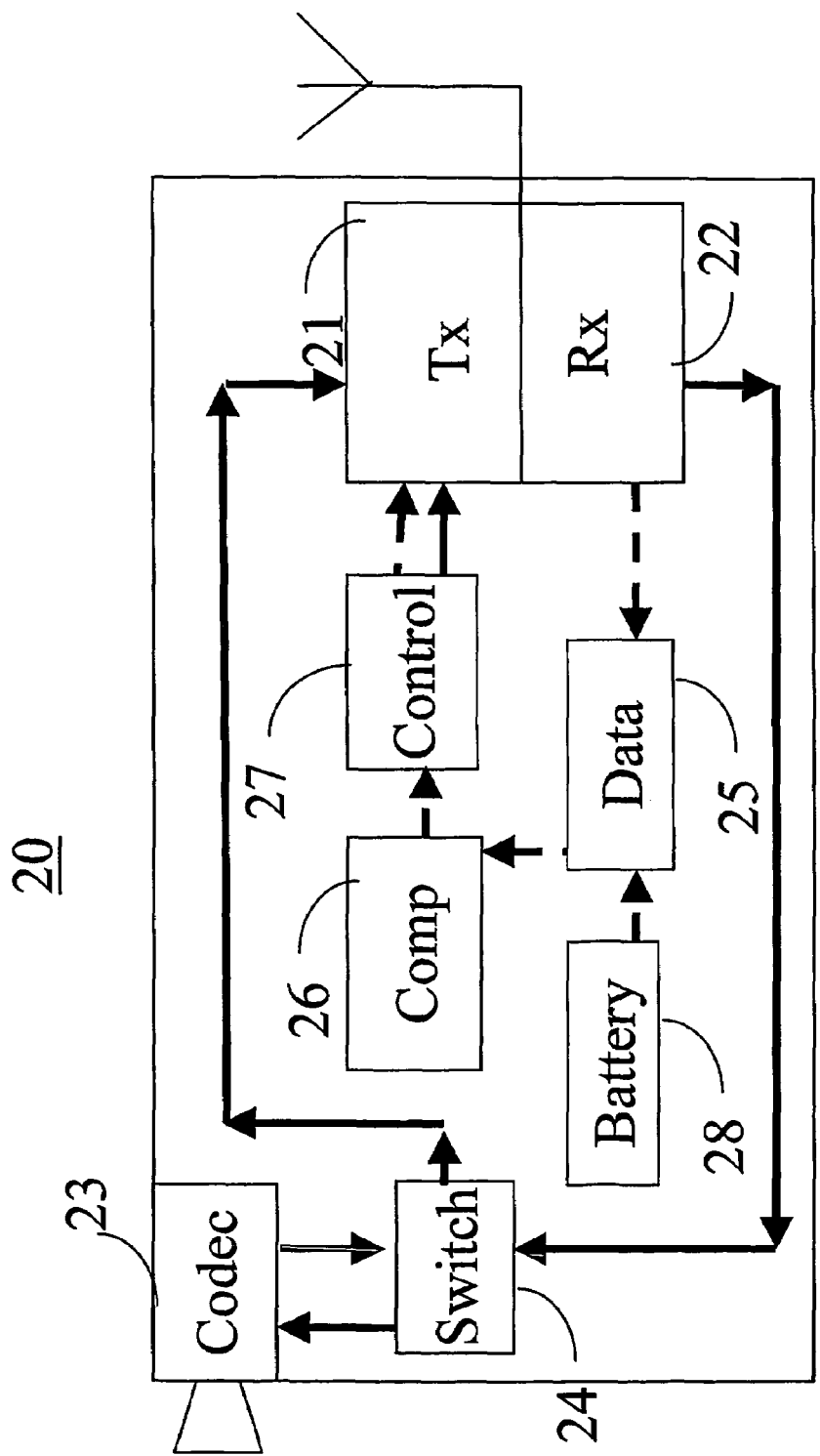
FIG. 2 is a schematic diagram showing the functional relationship of the elements of a device according to the invention.

FIG. 2 shows a device 20 according to the invention. It comprises a wireless transmitter 21 and a wireless receiver 22. In this embodiment the device includes a codec 23 (coder/decoder) for handling voice traffic. However, the invention may also be used with devices configured for data collection. Some of the devices in the system may be pure relay devices, having no facility for originating or terminating calls. The device 20 has call switching means 24 for controlling call traffic received from the receiver 22 and the codec 23, and forwarding it to the transmitter 21 or codec 23 as required. The routing of calls is controlled by address information coded into the call, which indicates to the switch 24 whether incoming data is intended for the subject device 20, or for some other device. The switch 24 routes the data accordingly, either to the codec 23 or to the transmitter 21 for relaying to other devices.

The transceiver 21/22 is operated under the control of a control unit 27, which selects the radio channels and other parameters on which the transmitter 21 is to operate, and also those on which the receiver 22 is to listen out. These channels are selected by a computation unit 26 which operates according to data received from other similar devices 30, 40 etc (FIG. 6) and stored in a data store 25. The device 20 is powered by a battery 28 whose condition is also monitored by the data store 25.

Figure 3:
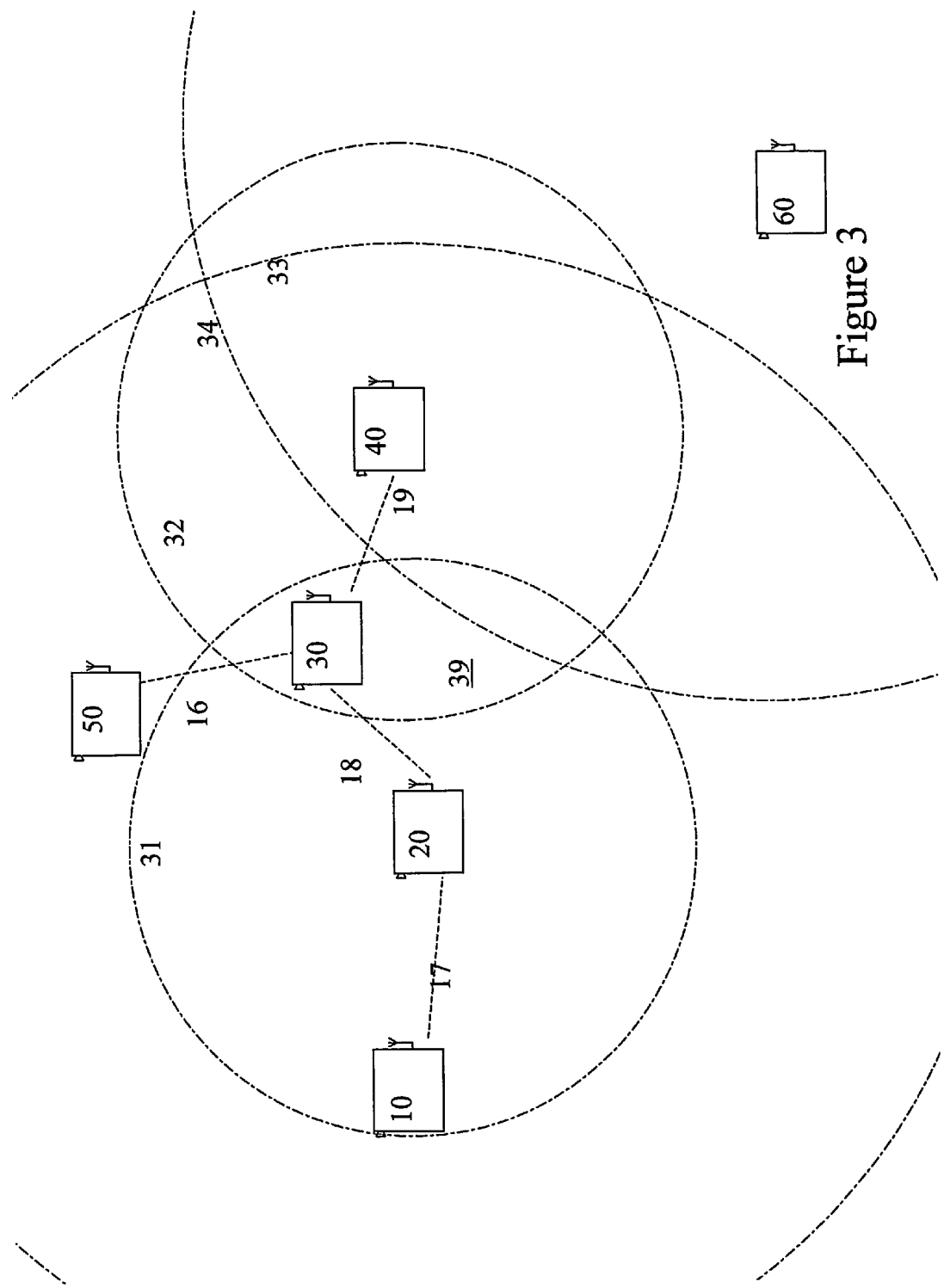
FIG. 3 is a diagram of part of an ad hoc network made up of devices of the kind shown in FIG. 2, illustrating the interference problem and its solution.

FIG. 3 shows a network comprising several devices 20, 30, 40, 50, each of the type shown in FIG. 2. These devices form an ad hoc wireless network 15, 16, 17, 18, 19, etc. The wireless connections 15, 16, 17, 18, 19 may use any transmission medium suitable for the environment in which the devices are expected to operate, but for present purposes they are assumed to use radio-frequency transmissions. Communication is made possible between any two devices, e.g. 10, 40 either directly or by means of one or more other devices 20, 30.

The devices 10, 20, 30, 40 etc are battery powered, and are limited to short-range wireless transmissions. The effective ranges of two of the devices 20, 40, in normal operation, are indicated by the curves 31, 32 shown in FIG. 3. These two devices are not in effective range of each other—however another device 30 is depicted within effective range of both devices 20, 40, and thus can be used to relay information between them.

Although the devices 20, 40 are not in direct radio range of each other, their ranges 31, 32 overlap. Consequently, if they were both to select the same channel for transmission, any device 30 located in the area of overlap 39 would experience interference between their transmissions. To avoid this, each device has to be arranged to transmit on a channel selected such that no co-channel interference will be detected by any other device within range.

In fact, the interference range 33 is typically longer than the effective range 31, as shown in FIG. 3 for device 20. In other words, a signal transmitted from a device 20 can still corrupt others at a range 33 beyond which it has degraded/weakened to the point where it can not be properly received. Similarly, the device 20 will detect interference between signals transmitted from any devices 40, 50, 60 located within the interference range 33.

In this illustrative embodiment, interference range 33 is assumed to be twice the effective range 31. Thus devices 40, 50 whose normal ranges are outside that of the device 20 generating the signal, can nevertheless detect the presence of that device 20 (and vice versa) such that they can select different channels on which to operate. However, interference can also be detected between devices considerably further away: for example in FIG. 3 the device 40 can detect signals from two devices 20, 60, whose overlapping interference ranges are depicted by curves 33, 34 respectively. However, neither of the devices 20, 60 causing the interference can detect each other in normal operation.

Figure 4:
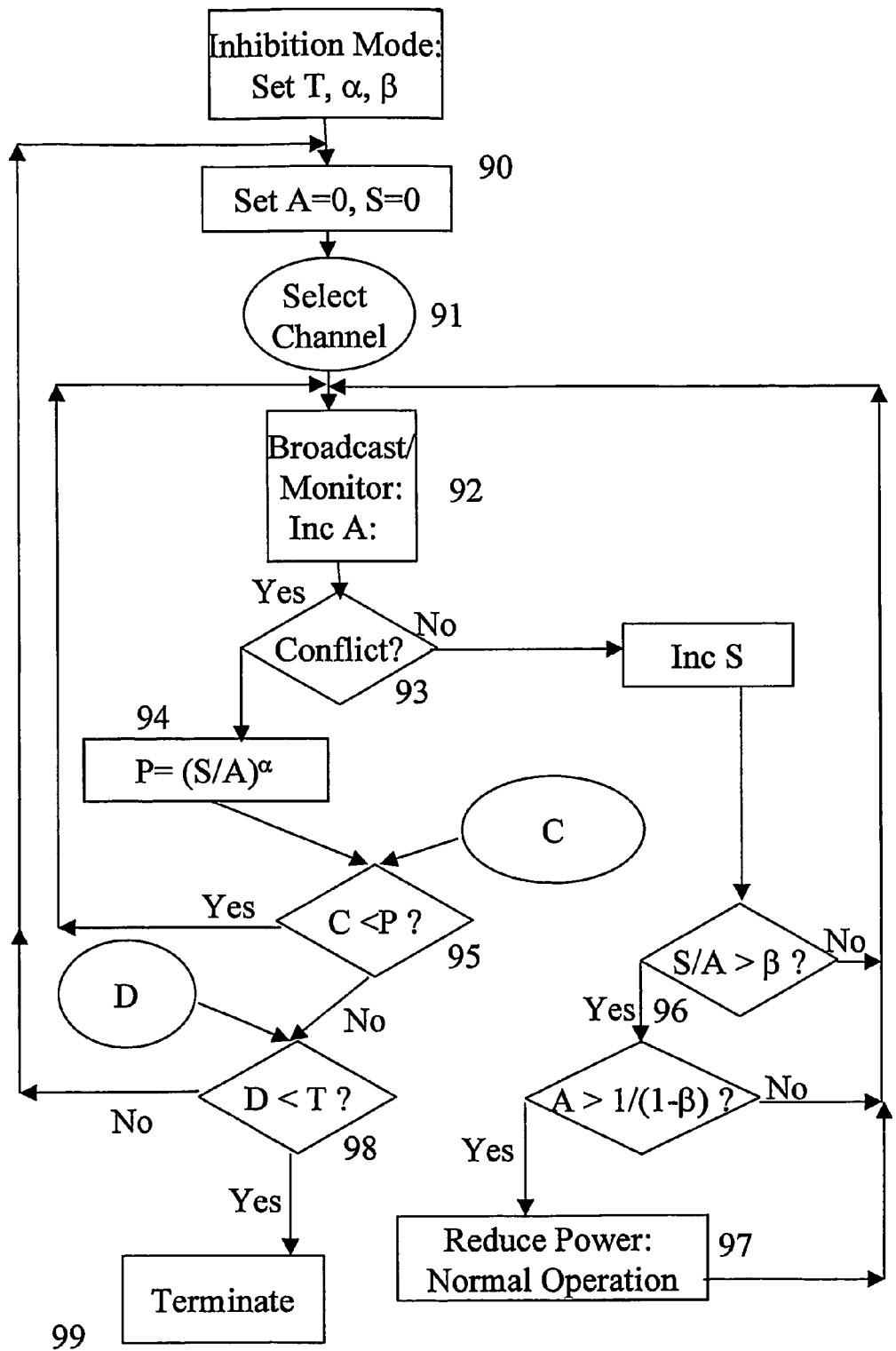
FIG. 4 is a flow chart illustrating a channel selection process according to the invention.

The process by which a transceiver device 20 selects a channel on which to operate will now be described in more detail, with reference to FIG. 4. In this process a number of random selections are made—these steps are indicated by ovals.

Each transceiver device 20 can operate on two different transmission power levels: "inhibitory" and "normal". All devices start in "inhibitory" mode (step 90) and broadcast a beacon signal periodically (step 92) on a channel chosen randomly (step 91). The power required by a transmitter is proportional to the square of the range required, so the inhibition power mode requires a substantially greater power output than the normal power mode. Because battery life is critical to the usefulness of each device, the process to be described is arranged to minimise the time spent in the inhibition mode.

The device also monitors the selected channel for interference (step 92). A device (e.g. 40) identifies a "conflict" between its own beacon and other signals (step 93) if, (and only if, it detects a signal on the same channel from another beacon—in other words if it is within interference range 33 of the source 20 of the perturbation. The beacon signals carry some means of identification of the transmitting device, so that the device can distinguish between interference from other devices and echoes of its own transmissions.

A process is then run (steps 93 to 99) to determine whether the device should persist in attempting to use the selected channel, or whether it should try to use a different one. If interference has been detected, the transmitter that caused the interference will, in general, be taking a similar decision. As the two devices may be out of normal range of each other, even at the enhanced power, they cannot co-operate to decide which one should change. To reduce the possibility that both devices take the same decision (whether that be to change or to stay), a randomising element is introduced to the decision process.

Each time a beacon signal is broadcast (step 92), a local variable A (attempt) is incremented representing the number of attempts that have been made. This variable is equivalent to a time counter if broadcasting takes place as a fixed periodic interval.

If no collision is detected (step 93), another local variable S (success) is also incremented, representing the number of successful attempts—that is, those which have not resulted in a collision perceptible at the device under consideration. The device next determines whether or not to "activate", i.e. change from "inhibitory" to "normal" mode, reducing emission power accordingly. (step 96) This is done if the perceived success level S/A is higher than a fixed "activation" threshold β, and the sample (proportional to the number of attempts) is perceived to be sufficient. This double condition is summarily defined as:

$$\frac{\text{success}}{\text{attempt}} > \beta \quad \text{(step 96)}$$

$$\text{attempt} > \frac{1}{1-\beta}$$

If either of these conditions is not satisfied, the device continues to broadcast on the selected frequency at the enhanced "inhibition" power level. However, if both conditions are satisfied, it switches to "normal" operation, in which it continues to transmit on the selected channel, but at normal (not "inhibition") power level. It continues to monitor the selected channel for conflicts,. If the device detects such a conflict, it will enter the "change behaviour" loop 94, 95, 98 and may eventually terminate (99) or change channel again (91).

If a collision is detected (step 93), the device determines whether or not it should change its behaviour. The decision is made on the basis of comparison of a number C between 0 and 1, generated randomly, with a threshold value P, also falling between 0 and 1, calculated by:

$$P = \left(\frac{\text{success}}{\text{attempt}}\right)^\alpha \quad \text{(step 94)}$$

This value increases as the number of successes (attempts in which no conflict is detected) increases, and falls if an unsuccessful attempt occurs, (in which a conflict is detected).

The parameter α is held constant during the process. If α=1, the probability P that the device will continue to operate in "inhibit" mode on the same channel is equal to the success rate S/A. This probability can be adjusted to be lower or higher than the success rate by adjusting the value of parameter α.

The values "P" and "C" are now compared (step 95). Since the value "C" is randomly selected, the probability that it is less than the value P calculated above is therefore also P, and the probability that it exceeds the value P is 1−P.

If the value of C is below the threshold P, statistically indicating that the rate of occurrence of conflicts is low, the device resumes broadcasting at inhibition level and monitoring for conflicts (step 92).

If the value of C is higher than the threshold P (step 95), statistically indicating a high collision rate, a further decision point is reached (step 98). The device is instructed to change its behaviour, in one of two ways selected as follows. A second randomly generated number D is compared with a fixed "termination" threshold T. Both values D, T lie between 0 and 1. The termination threshold is set such that there is a probability "T" that the device will abandon the process of allocating a channel for itself. If the random number D is below the termination threshold T, the node "self-terminates", and switches itself out of the process (step 99). This ensures that over time the number of devices unsuccessfully attempting to secure a channel for their own use reduces. Devices are more likely to detect collisions in areas where there is a high population density of devices, inducing intense competition for available channels, so that some devices may need to be switched out of the system to allow a successful allocation plan. A terminated device may be reactivated on future cycles, for example to accommodate changes in the network such as relative movement of devices, or exhaustion of the batteries of other devices.

If the device does not self-terminate, it selects another channel at random (step 91) and the "attempt" and "success" variables are re-initialised. There is a high probability that any channel that has already been tried and rejected by that device because of a detected collision is still likely to be in use by the device that caused the collision, so the newly-selected channel is preferably one that that has not been tried before by that device.

As the process continues, each device will settle down, operating in normal mode on its selected channel. Closely neighbouring devices (first neighbours) will still be able to detect them, and avoid the use of the same channel. Moreover, whilst some more remote devices remain in "inhibit" mode, they can still influence the behaviour of devices which are in normal mode.

If conditions are not constant, for example because of varying bandwidth demand, devices dropping out of service as their batteries are exhausted, or because nodes are moving around, the process may be repeated periodically or it may run continuously.

Although the invention has particular advantages when used with relay devices that are initially not in communication with each other or a central point, the invention can also be used by a central computer having the necessary information on location and capabilities of the devices to allow the process to take place. The computer simulate the interactions that would take place between the devices, and the results of the negotiation can then be transmitted to the real elements by any available means. This reducing the computing power required for the individual devices, and therefore their complexity and energy requirements. They also do not need to transmit at high power, as this is simulated by the computer. However, such an arrangement is only possible when the devices are all capable of communication with the central computer.

In the following analysis, computer-based simulations of this kind have been used, using illustrative distributions of devices. Preliminary tests have demonstrated the ability of a network of devices operating according to the invention to dramatically reduce long-range interference on the basis of local information only, and to generate a large set of stable links spanning the entire population of devices. A first series of simulations involved using square lattices of different sizes in order to underline the algorithm's scalability (a predictable consequence of this embodiment relying on the application of local rules by individual nodes). In these simulations the network is assumed to be static: that is to say that bandwidth demand, node position and node availability do not vary.

Figure 1:
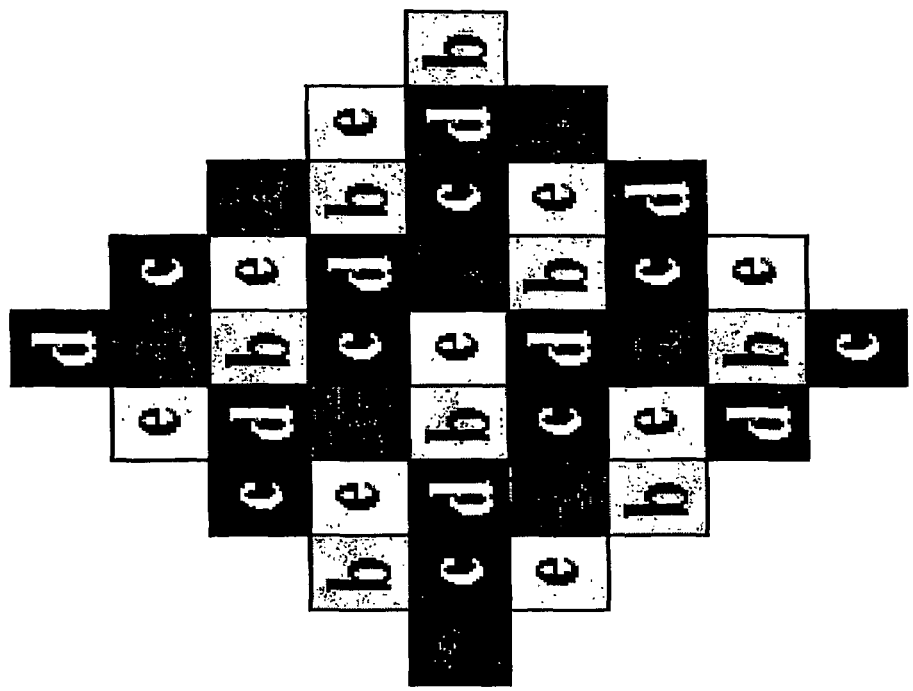
FIG. 1 represents the tiling problem discussed above.
Figure 1:
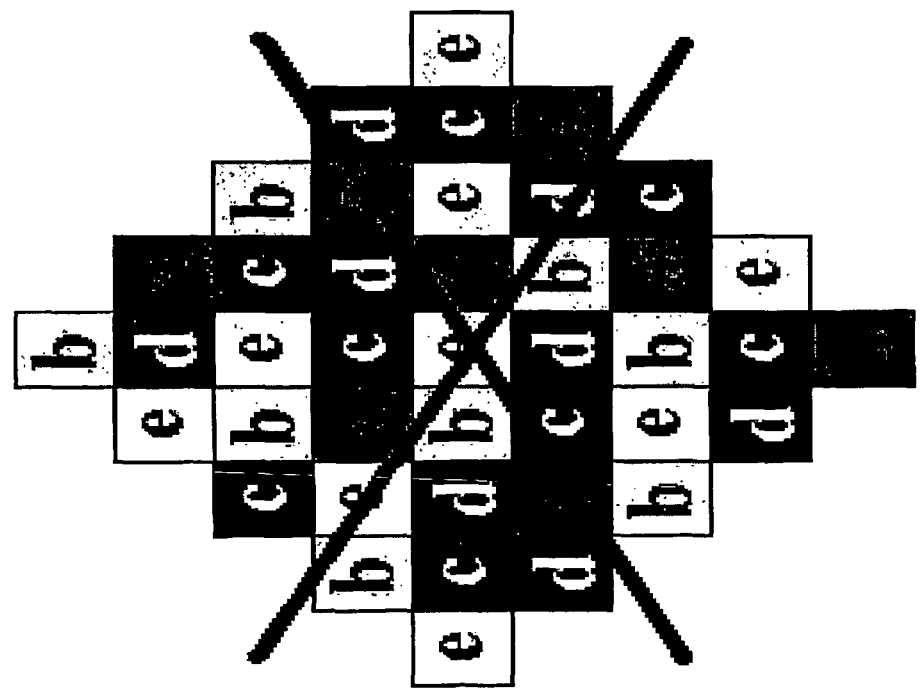
Figure 5:
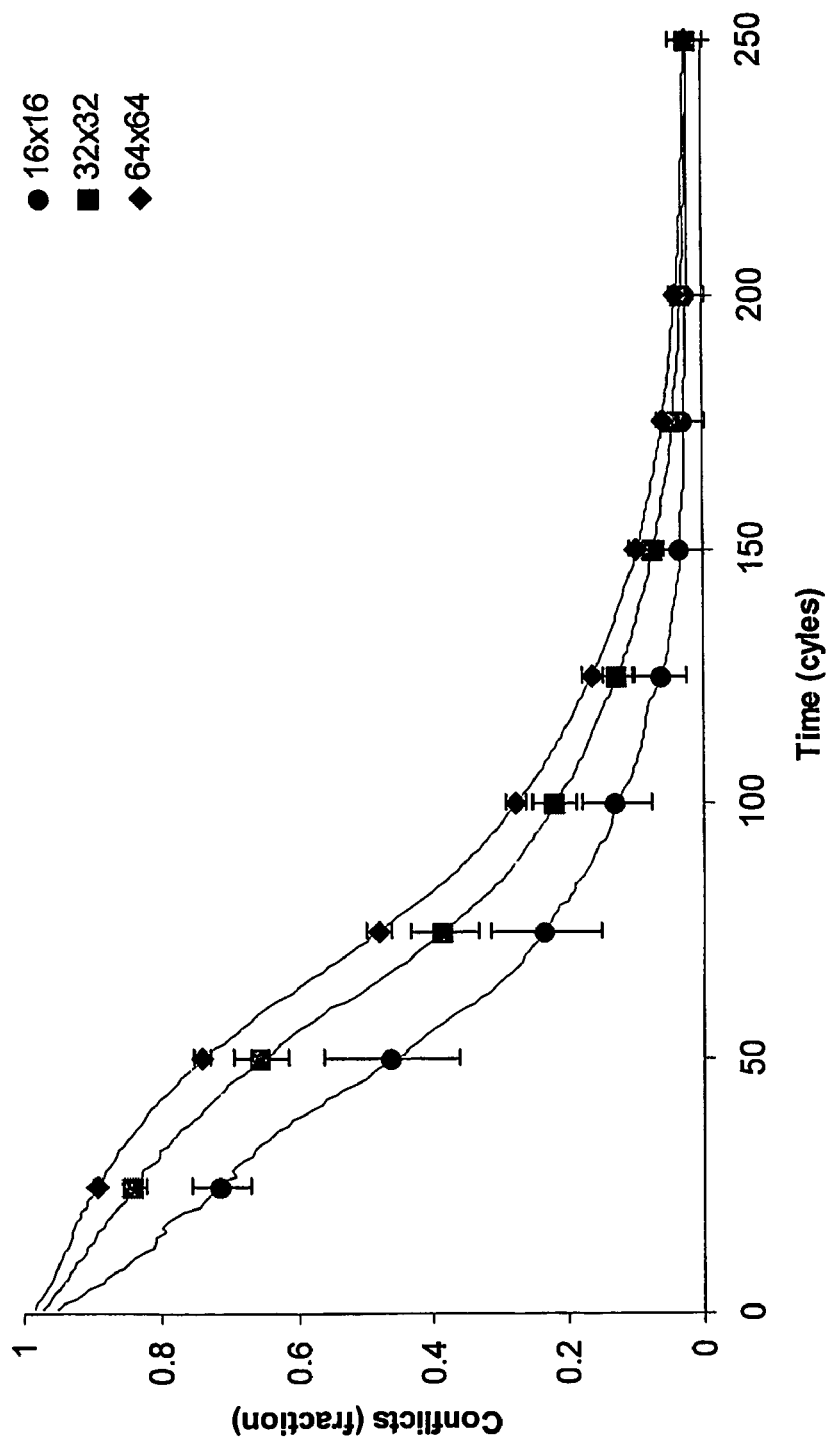
FIG. 5 shows the evolution of the fraction of conflicts as a function of time.

FIG. 5 shows the evolution of the fraction of conflicts as a function of time for an array of devices arranged in a simple 16×16 grid (bottom curve), and two larger grids of dimension 32×32 and 64×64 (middle and upper curves respectively). As in FIG. 1, each device, when in normal mode, can only communicate with its immediate neighbours, which are all at a distance equal to the grid spacing. A device in "inhibitory" mode can also be detected by devices within a distance equal to twice the grid spacing—this of course includes those devices diagonally adjacent to the device in question, which are at approximately 1.4 times the grid spacing. Conflict arises whenever a device does not have a stable link to all of its surviving immediate neighbours. From t=200 onwards, the system more or ceases evolution, and conflicts only represent a small fraction of survivors (i.e. nodes which have not yet terminated the process). This timescale is almost independent of the number of devices involved, which is a consequence of each device performing the process for itself, with the computational power being proportional to the number of devices participating. The small decrease in efficiency for larger systems is attributable to boundary conditions, since nodes near the edge necessarily experience less interference, and the fraction they represent is an inverse function of total size. A stable channel allocation plan will therefore develop through the co-operative operation of the individual devices, without any overall control.

It will be understood that the rectilinear grid configuration has been used to illustrate the allocation process: in practice the devices will not conveniently line up in a rectilinear formation but will be disposed essentially randomly, as is shown for example in FIG. 6, which shows the results of a second series of simulations, in which the same frequency selection algorithm was applied to a more realistic environment (i.e. irregular spatial distribution). In FIG. 6, the effective range of the devices in "normal" mode is indicated by the size of the small circle 71, and in "inhibition" mode by the intermediate sized circle 72. As before, interference range is double the effective range, so is represented by the circle 72 in normal mode and the large circle 73 in inhibition mode.

The irregular distribution complicates the problem considerably by making the number of first and second neighbours a variable instead of a pre-defined parameter, the simulation showed that this invention was capable of handling this situation as well. Basically, convergence is slower, "self-termination" rate higher and more frequencies have to be available in order to reach a similar level of connectivity in the emerging configuration. However, overall, the process still performs well once parameter values have been adjusted to the circumstances, as shown on FIG. 6.

Depending on expected population density, parameter values ($\alpha$, $\beta$, number of available frequencies, "self-termination" probability) usually need adjustment. Clearly, the formation of islands, such as those shown at 74, 75, cannot be completely prevented, but most devices still end up in the largest sub-set of mutually reachable nodes. From t=200 onwards, the system more or ceases evolution, and conflicts only represent a small fraction of survivors (i.e. nodes which have not yet terminated the process).

What is claimed is:

1. A wireless communications relay device, comprising:
   a receiver for detecting transmissions from other such devices;
   a transmitter for transmitting signals at a first power level for normal traffic, and a higher, inhibition level, in order that its transmissions may be detected by other such devices over a wider area than its normal operating range; and
   a control means for selecting a channel and a transmission power on which the transmitter will operate, the control means being arranged to inhibit the transmitter from selecting channels detected by the receiver when the transmitter is operating at the inhibition level to prevent co-channel interference between transmitters of wireless communications relay devices that are not in the normal operating range of each other but whose normal operating ranges overlap.

2. A device according to claim 1, having means for monitoring the selected channel for conflicting transmissions from other devices, and the control means being arranged to determine, from the conflicts detected, whether to operate on the same or a different channel.

3. A device according to claim 2, in which the control means is arranged to select a channel for operation by an iterative process, in which a plurality of attempts are made to use a selected channel, and the probability of the channel being selected increases according to the number of such attempts on which no conflicting transmissions are identified.

4. A device according to claim 3, in which the control means is arranged to update a property according to the number of attempts to use a given channel that have identified interference on that channel, and to control a probabilistic function of the said property to determine whether to switch to a different channel for subsequent attempts.

5. A device according to claim 4, wherein the control means is arranged to cause the device to operate at normal power on the selected channel if the said property also satisfies a threshold value.

6. A device according to claim 4, having means to suspend its operation if no suitable channel is identified on which to operate.

7. A method of channel selection in a network of wireless communications relay devices, wherein each device is inhibited from operating on a channel detectable on transmissions received from another such device, when operating at an inhibition transmission power, in order to inhibit other such devices from selecting the same channel, wherein the inhibition transmission power is higher than the normal transmission power of the devices such that selection of the same channel is inhibited over a wider area than the normal operating range of the device to prevent co-channel interference between transmitters of wireless communications relay devices that are not in the normal operating range of each other but whose normal operating ranges overlap.

8. A method according to claim 7, wherein each device performs the channel selection process for itself, each device being operable on a selected channel at the inhibition transmission power and being capable of detecting transmissions from other such devices on the selected channel.

9. A method according to claim 8, wherein each device selects a channel on which to attempt to operate, and each such device transmits on that channel and also monitors the channel for conflicting transmissions from other devices, and determines, from the conflicts detected, whether to operate on the same or a different channel.

10. A method according to claim 7, wherein the channel selection process is operated on a computer, programmed with the relative separations and characteristics of the devices, and having means to control the operation of the relay devices in accordance with the results of the selection process.

11. A method according to claim 7, in which a channel is selected for operation by an iterative process, in which a plurality of attempts are made to use a selected channel, and the probability of the channel being selected increases according to the number of such attempts on which no conflicting transmissions are identified.

12. A method according to claim 11, in which a property associated with each device is updated according to the number of attempts to transmit on a given channel that have detected interference on that channel, and the said property is then used to control a probabilistic function which determines whether to switch to a different channel for subsequent attempts.

13. A method according to claim 12, wherein if the said property also satisfies a threshold value the device is instructed to operate at normal power on the selected channel.

14. A method according to claim 12, in which devices for which no suitable channel is identified on which to operate are instructed to suspend operation.

15. A wireless communications relay device, comprising:
   a receiver that detects transmissions;
   a transmitter that transmits signals at a lower power level for establishing a narrower operating range and a higher power level for establishing a wider operating range so that a transmitted signal at the higher power level may be detected by another such device which is within the wider operating range but outside of the narrower operating range; and
   a controller that selects a channel and a transmission power on which the transmitter will operate, the controller being arranged to reduce a possibility of the transmitter selecting channels detected by the receiver when the transmitter is operating at the higher power level to reduce a possibility of co-channel interference between transmitters of wireless communications relay devices that are not in the narrower operating ranges of each other but whose narrower operating ranges overlap.

16. A device according to claim 15, wherein the controller monitors the selected channel for a conflicting transmission from the another such device and determines whether to operate on the same or a different channel based on detection of the conflicting transmission.

17. A method of channel selection in a network of wireless communications relay devices, the method comprising:
   detecting, in at least one device, transmissions;
   transmitting, from the at least one device, signals at a lower transmission power for establishing a narrower operating range of the at least one device and a higher transmission power for establishing a wider operating range of the at least one device so that the transmitted signal at the higher transmission power may be detected by another such device which is within the wider operating range of the at least one device but outside of the narrower operating range of the at least one device; and
   selecting, when the at least one device is operating at the higher transmission power, a channel and a transmission power on which signals from the at least one device will be transmitted, such that a likelihood of a selection of the same channel as that of the another such device which is within the wider operating range of the at least one device but outside of the narrower operating range of the at least one device is reduced to reduce a likelihood of co-channel interference between transmissions of the at least one device and the another such device, the at least one device and the another such device not being within the narrower operating ranges of each other but whose narrower operating ranges overlap.

18. A method according to claim 17, wherein the at least one device and the another such device each selects a channel on which to attempt to operate, and the at least one device and the another such device each transmits on that selected channel and also monitors the channel for conflicting transmissions from other devices, and determines, from the conflicts detected, whether to operate on the same or a different channel.

* * * * *